(12) United States Patent
Lee et al.

(10) Patent No.: US 8,633,295 B2
(45) Date of Patent: Jan. 21, 2014

(54) BLEND OF POLYLACTIC ACID RESIN AND COPOLYESTER RESIN, AND MOLDED PRODUCT USING SAME

(75) Inventors: Roy Lee, Seoul (KR); Jong-Ryang Kim, Suwon-si (KR); Kye-Yune Lee, Suwon-si (KR); Jong-Wook Shin, Suwon-si (KR); Young-Man Yoo, Seoul (KR)

(73) Assignee: SK Chemicals Co., Ltd., Seongnam-Si (KR)

( * ) Notice: Subject to any disclaimer, the term of this patent is extended or adjusted under 35 U.S.C. 154(b) by 0 days.

(21) Appl. No.: 13/698,930

(22) PCT Filed: May 19, 2011

(86) PCT No.: PCT/KR2011/003710
§ 371 (c)(1), (2), (4) Date: Nov. 19, 2012

(87) PCT Pub. No.: WO2011/145899
PCT Pub. Date: Nov. 24, 2011

(65) Prior Publication Data
US 2013/0072642 A1  Mar. 21, 2013

(30) Foreign Application Priority Data
May 20, 2010 (KR) ........................ 10-2010-0047231

(51) Int. Cl.
*C08L 67/04* (2006.01)
*C08L 67/03* (2006.01)
*C08J 5/00* (2006.01)

(52) U.S. Cl.
USPC ............ 528/272; 528/300; 528/302; 525/166

(58) Field of Classification Search
USPC .......................... 528/272, 300, 302; 525/166
See application file for complete search history.

(56) References Cited

U.S. PATENT DOCUMENTS

| 6,063,464 | A | * | 5/2000 | Charbonneau et al. ..... 428/36.92 |
| 6,818,730 | B2 | | 11/2004 | Brandenburg et al. |
| 6,914,120 | B2 | * | 7/2005 | Germroth et al. ............. 528/300 |
| 7,368,511 | B2 | * | 5/2008 | Hale et al. ..................... 525/411 |
| 7,666,501 | B2 | | 2/2010 | Kurian et al. |
| 7,989,559 | B2 | | 8/2011 | Ido |
| 8,066,923 | B2 | | 11/2011 | Kurian et al. |
| 2003/0204029 | A1 | | 10/2003 | Brandenburg et al. |
| 2007/0128436 | A1 | | 6/2007 | Kurian et al. |
| 2007/0128459 | A1 | | 6/2007 | Kurian et al. |
| 2007/0129503 | A1 | | 6/2007 | Kurian et al. |
| 2008/0071038 | A1 | | 3/2008 | Ido |
| 2010/0105841 | A1 | | 4/2010 | Kurian et al. |
| 2011/0071238 | A1 | * | 3/2011 | Bastioli et al. .................. 524/17 |
| 2011/0263762 | A1 | | 10/2011 | Matsuno et al. |
| 2013/0071588 | A1 | * | 3/2013 | Bastioli et al. ............... 428/35.5 |

FOREIGN PATENT DOCUMENTS

| JP | 2004-099659 | * | 4/2004 |
| KR | 10-2005-0056021 A | | 6/2005 |
| KR | 10-2007-0103045 A | | 10/2007 |
| KR | 10-2008-0077661 A | | 8/2008 |
| WO | WO 2010/053167 A1 | | 5/2010 |

* cited by examiner

*Primary Examiner* — Nathan M Nutter
(74) *Attorney, Agent, or Firm* — Birch, Stewart, Kolasch & Birch, LLP

(57) ABSTRACT

A blend of polylactic acid resin and copolyester resin and a molded article using the same having superior impact resistance and heat resistance are disclosed. The blend of polylactic acid resin and copolyester resin includes: 5 to 95 weight % of polylactic acid resin; and 5 to 95 weight % of copolyester resin which is a copolymerization product of an acid component including terephthalic acid and a diol component including 5 to 99 mol % of 1,4-cyclohexanedimethanol and 1 to 60 mol % of isosorbide(bio monomer), and has a repeated structure of an acid moiety derived from the acid component and a diol moiety derived from the diol component.

14 Claims, No Drawings

BLEND OF POLYLACTIC ACID RESIN AND COPOLYESTER RESIN, AND MOLDED PRODUCT USING SAME

TECHNICAL FIELD

This invention relates to a blend of polylactic acid resin and copolyester resin and a molded article using the same, and more particularly, to a blend of polylactic acid resin and copolyester resin and a molded article using the same having superior impact resistance and heat resistance.

BACKGROUND ART

Polylactic acid(PLA) resin is a plant-derived resin which can be obtained from plants such as a corn, and has a biodegradable property. Compared with conventional petroleum resins such as polystyrene resin, polyvinylchloride(PVC) resin, polyethylene resin, and so on, the polylactic acid resin is advantageous in saving petroleum resources, preventing discharge of carbonic acid gas, and thereby decreasing environmental pollution. Recently, environmental pollution by waste plastics becomes one of social problems. Thus, instead of conventional plastics (petroleum resin), it is tried to use the polylactic acid resin in the areas of food packages and containers, cases for electronic devices, and so on. However, compared with conventional petroleum resins, polylactic acid resin is not satisfactory in their impact resistance and heat resistance.

To solve these drawbacks, polylactic acid resin is blended with one or more conventional petroleum plastic resins. For example, in Korean patent Laid-open No. 10-2005-0056021, polylactic acid resin and polycarbonate resin are blended to make up for the low impact resistance and heat resistance of polylactic acid. However, in this case, as the amount of blended polycarbonate resin increases to increase the impact resistance and heat resistance, the portion of the petroleum plastic resin increases, and the portion of polylactic acid resin decreases in the blend. Thereby, the aim of using polylactic acid is not sufficiently fulfilled.

DISCLOSURE

Technical Problem

Therefore, it is an object of the present invention to provide a blend of polylactic acid resin and copolyester resin and a molded article using the same having superior impact resistance and heat resistance and also including relatively large amount of bio-materials.

Technical Solution

In order to achieve these objects, the present invention provides a blend of polylactic acid resin and copolyester resin comprising: 5 to 95 weight % of polylactic acid resin; and 5 to 95 weight % of copolyester resin which is a copolymerization product of an acid component including terephthalic acid and a diol component including 5 to 99 mol % of 1,4-cyclohexanedimethanol and 1 to 60 mol % of isosorbide, and has a repeated structure of an acid moiety derived from the acid component and a diol moiety derived from the diol component. Also, the present invention provides a molded article which is produced by molding the blend of polylactic acid resin and copolyester resin.

Advantageous Effects

The blend of polylactic acid resin and copolyester resin according to the present invention is prepared by blending polylactic acid resin and copolyester resin including isosorbide(bio-monomer). Thus, even when the amount of copolyester resin increases, the total amount of bio-materials (polylactic acid resin and isosorbide) in the blend is maintained relatively large, which makes the blend environmentally friendly and also makes up for (increases) the low impact resistance and heat resistance of polylactic acid resin. Compared with a blend including other conventional petroleum resins, the blend of the present invention can prevent the formation of air bubbles during a thermoforming process. Therefore, an additional drying process of a molded article is not necessary and it is advantageous economically and in time-saving.

MODE FOR INVENTION

Hereinafter, the present invention will be explained in more detail.

The blend of polylactic acid resin and copolyester resin according to the present invention comprises polylactic acid (PLA) resin and copolyester resin having isosorbide (bio-monomer).

The polylactic acid resin useful in the present invention includes conventional polylactic acid resin, and specifically, commercially available polylactic acid resin. Generally, the polylactic acid resin can be prepared from monomers derived from L-lactic acid and/or D-lactic acid. If the advantageous effect of the present invention is not deteriorated, the polylactic acid resin may include (i.e., can be prepared with) some amount of other monomers which are not derived from L-lactic acid and/or D-lactic acid. The polylactic acid resin can be prepared by various methods. Most representative method is a ring-opening polymerization of lactide which is produced from lactic acid. However, the method for preparing polylactic acid is not limited to this method, and the polylactic acid can also be prepared by direct polycondensation of lactic acid. The polylactic acid resin prepared with monomer derived from L-lactic acid or D-lactic acid is a crystalline polymer having a high melting point. However, when the polylactic acid resin is prepared with L-lactide, D-lactide and meso-lactide derived from L-lactic acid and D-lactic acid, the crystallinity and the melting point of the polylactic acid can be varied according to the amounts of L-lactide, D-lactide and meso-lactide. Thus, the amount of each component can be determined according to the use of the polylactic acid.

The number average molecular weight of polylactic acid resin useful in the present invention is 10,000 to 500,000, and preferably 10,000 to 300,000. When the number average molecular weight of polylactic acid resin is less than 10,000, the physical properties such as impact resistance may be insufficient. When the number average molecular weight of polylactic acid resin is more than 500,000, it is difficult to mold the polylactic acid due to its high molecular weight.

In the present invention, the copolyester resin is used not only to improve the impact resistance and the heat resistance of the blend of polylactic acid resin and copolyester resin, but also to increase the amount of bio-materials in the blend. The copolyester resin is a copolymerization product of an acid component including terephthalic acid and a diol component including 5 to 99 mol % of 1,4-cyclohexanedimethanol and 1 to 60 mol % of isosorbide(chemical formula 1), and has a repeated structure of an acid moiety derived from the acid component and a diol moiety derived from the diol component.

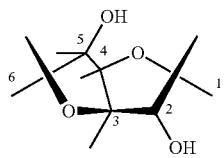

<Chemical formula 1>

The acid component includes terephthalic acid as a main component. Specifically, the acid component may consist of only terephthalic acid, or may consist of terephthalic acid and one or more copolymerization acid components(copolymerization monomers) for improving the physical properties of the polyester resin. The copolymerization acid component can be selected from the group consisting of aromatic dicarboxylic acid component of 8 to 14 carbon atoms and aliphatic dicarboxylic acid component of 4 to 12 carbon atoms. The amount of the copolymerization acid component is preferably 0 to 50 mol %, for example, 0.1 to 40 mol %, and more preferably 0.1 to 10 mol % with respect to the total acid component. If the amount of the copolymerization acid component is less than or more than the above mentioned range, the improvement of the physical properties of the polyester resin may be insufficient, or even the original physical properties of the polyester resin may be deteriorated. The aromatic dicarboxylic acid component of 8 to 14 carbon atoms includes conventional aromatic dicarboxylic acid components for preparing polyester resin, except for terephthalic acid component, and examples thereof include isophthalic acid, naphthalene dicarboxylic acid such as 2,6-naphthalene dicarboxylic acid, diphenyl dicarboxylic acid, and so on. The aliphatic dicarboxylic acid component of 4 to 12 carbon atoms includes conventional linear, branched or cyclic aliphatic dicarboxylic acid components for preparing polyester resin, and examples thereof include cyclohexane dicarboxylic acid such as 1,4-cyclohexane dicarboxylic acid, 1,3-cyclohexane dicarboxylic acid, and so on, phthalic acid, sebacic acid, succinic acid, isodecyl succinic acid, maleic acid, fumaric acid, adipic acid, glutaric acid, azelaic acid, and so on. The acid component may consist of single component or two or more mixed components. In this specification, the term "terephthalic acid component" includes terephthalic acid, alkyl ester(lower alkyl(1 to 4 carbon atoms) ester such as monomethyl, monoethyl, dimethyl, diethyl or dibutyl ester) thereof, and/or acid anhydride thereof, which react with glycol component to form a terephthaloyl moiety. The acid component and the diol component react with each other in the conventional polymerization reaction, and hydrogen, hydroxy group or alkoxy group are removed from the acid component and the diol component to remain residues. In this specification, the terms "acid moiety" and "diol moiety" mean the residues of the acid component and the diol component.

The diol component includes (i) 5 to 99 mol %, preferably 5 to 95 mol %, more preferably 8 to 91 mol % of 1,4-cyclohexanedimethanol and (ii) 1 to 60 mol %, preferably mol % range of the following Equation 1 and equal or less than 60 mol %, more preferably 4 to 40 mol % of isosorbide with respect to the total diol component. In following Equation 1, ISB mol % represents the amount of isosorbide, and CHDM mol % represents the amount of 1,4-cyclohexanedimethanol.

$$0.0012(\text{CHDM mol \%})^2 - 0.2401(\text{CHDM mol \%}) + 14.136 \leq \text{ISB mol \%} \leq 0.0049(\text{CHDM mol \%})^2 - 0.2255(\text{CHDM mol \%}) + 71.176$$ [Equation 1]

Besides (i) 1,4-cyclohexanedimethanol and (ii) isosorbide, the diol component may further include (iii) ethylene glycol and (iv) other copolymerization diol component(monomer) for improving the physical properties of the polyester resin. The copolymerization diol component can be selected from diethylene glycol, triethylene glycol, propanediol (for example, 1,2-propanediol, 1,3-propanediol), 1,4-butanediol, pentanediol, hexanediol (for example, 1,6-hexanediol), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, tetramethylcyclobutanediol, mixtures thereof, and so on. Except for (i) 1,4-cyclohexanedimethanol and (ii) isosorbide, if other diol component is used, the main component of the other diol component is preferably (iii) ethylene glycol. The amount of (iv) the other copolymerization diol component for improving the physical properties of the polyester resin is preferably 0 to 50 mol %, for example 0.1~40 mol %, and more preferably 0.1 to 10 mol % with respect to the total diol component. In the polyester resin of the present invention, by controlling the amounts of 1,4-cyclohexanedimethanol and isosorbide(1,4:3,6-dianhydroglucitol) as previously stated, the impact strength of the polyester resin rapidly increases in proportion to the amount of 1,4-cyclohexanedimethanol. Therefore, in the present invention, 1,4-cyclohexanedimethanol and isosorbide improve the physical properties such as moldability of a homopolymer prepared with only terephthalic acid and ethylene glycol. When the amount of 1,4-cyclohexanedimethanol is less than 5 mol %, the impact strength of the polyester resin may be insufficient. When the amount of 1,4-cyclohexanedimethanol is more than 99 mol %, the amount of isosorbide is less than 1 mol % and the heat-resistance of the polyester resin may decrease. Meanwhile, when the amount of isosorbide is less than 1 mol %, the heat-resistance of the polyester resin may be insufficient, and when the amount of isosorbide is more than 60 mol %, the color of the polyester resin may become yellow.

When the polyester resin is molded into a test sample of thickness of 3.2 mm, the notch izod impact strength (ASTM D256 method, measuring temperature: 23° C.) of the test sample is preferably equal or more than 50 J/m. On the other hand, when a copolyester resin is prepared with only ethylene glycol and isosorbide, the test sample generally has the notch izod impact strength of equal or less than 50 J/m. When the polyester resin used in the present invention is annealed at 300° C. for 5 minutes, and is cooled to room temperature, and then is re-heated (2nd scan) with a temperature increasing speed of 10° C./min, the polyester resin preferably shows a glass transition temperature (Tg) of equal or more than 90° C. Meanwhile, when the polyester resin used in the present invention is dissolved with orthochlorophenol (OCP) to a concentration of 1.2 g/dl, the polyester resin shows an intrinsic viscosity of equal or more than 0.35 dl/g, preferably more than 0.40 dl/g, more preferably 0.45 dl/g at the temperature of 35° C. The polyester resin used in the present invention has superior heat resistance and impact strength. Thus, when the polyester resin is blended with polylactic acid resin, the polyester resin makes up for the low impact resistance and heat resistance of polylactic acid.

The copolyester resin can be prepared by an esterification reaction (Step 1) and a polycondensation reaction (Step 2). The esterification reaction (Step 1) can be carried out in a batch-wise manner or in a continuous manner. Each reactant (acid component and diol component) can be introduced into a reactor separately, but it is preferable to introduce a slurry including the diol component and the acid component into the reactor.

The polymerization method of the copolyester resin will be explained in more detail. First, the diol component and the acid component are introduced in to the reactor so that the amount of 1,4-cyclohexanedimethanol is 10 to 90 weight part, preferably 20 to 80 weight part with respect to 100 weight part of the acid component, and the esterification reaction is carried out at 200 to 300° C., preferably 240 to 260° C., more preferably 245 to 255° C. and at an increased pressure of 0.1 to 3.0 kg/cm$^2$, preferably 0.2 to 3.0 kg/cm$^2$. If the amount of 1,4-cyclohexanedimethanol is less than 10 weight part with respect to 100 weight part of the acid component, unreacted acid component may remain after the polymerization reaction and the transparency of the resin may be deteriorated. If the amount of 1,4-cyclohexanedimethanol is more than 90 weight part with respect to 100 weight part of the acid component, the polymerization reaction rate may become too slow, and the productivity of the resin may be unsatisfactory. The reaction time of the esterification reaction (average retention time) is generally 100 minutes~10 hours, preferably 2 hours~500 minutes, which can be varied according to a reaction temperature, a reaction pressure, a ratio of diol component and the acid component, and so on. When the process for preparing polyester resin is divided into the esterification reaction (Step 1) and the polycondensation reaction (Step 2), the esterification reaction does not require a catalyst, but the catalyst can be used to reduce the reaction time.

After completion of the esterification reaction (Step 1), the polycondensation reaction (Step 2) is carried out. Before the initiation of the polycondensation reaction (Step 2), a polycondensation catalyst, a stabilizer, a brightening agent and other additives can be added to the product of the esterification reaction. The polycondensation catalyst can be selected from conventional titanium based catalyst, germanium based catalyst, antimony based catalyst, aluminum based catalyst, tin based catalyst, and mixtures thereof.

Examples of the preferable titanium based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethylacetoaceticester titanate, isostearyl titanate, titanium dioxide, titanium dioxide/silicon dioxide co-precipitates, titanium dioxide/zirconium dioxide co-precipitates, and so on. Examples of the preferable germanium based catalyst include germanium dioxide and co-precipitates of germanium dioxide. As the stabilizer for the polycondensation reaction, conventional phosphor based stabilizers, such as phosphoric acid, trimethyl phosphate, triethyl phosphate, and so on, can be used. Preferably, the stabilizer is added so that the amount of phosphor of the stabilizer is 10~100 ppm with respect to the total weight of the produced polymer. When the amount of phosphor of the stabilizer is less 10 ppm, the polyester resin may not be sufficiently stabilized and the color of the polymer may become yellow. When the amount of phosphor is more than 100 ppm, the polymerization degree of the polymer may be insufficient. The brightening agent is added to improve the color property of the polymer. Examples of the brightening agent include conventional brightening agent such as cobalt acetate, cobalt propionate, and so on. If necessary, organic brightening agent can be used as the brightening agent. The preferable amount of the brightening agent is 0~100 ppm with respect to the total weight of the produced polymer. Generally, the polycondensation reaction is carried out at the temperature of 260~290° C. , preferably 260~280° C., more preferably 265~275° C. and at the reduced pressure of 400~0.1 mmHg. The reduced pressure of 400~0.1 mmHg is maintained in order to remove by-product (glycol) of the polycondensation reaction. The polycondensation reaction can be carried out until desired intrinsic viscosity of the polyester resin is achieved, and, for example, can be carried out for an average retention time of 1~10 hours.

The blend of polylactic acid resin and copolyester resin according to the present invention includes 5 to 95 weight %, preferably 10 to 90 weight % of polylactic acid resin; and 5 to 95 weight %, preferably 5 to 90 weight %, more preferably 10 to 85 weight% of polyester resin. In the blend, when the amount of the polylactic acid resin is less than 5 weight %, or the amount of the copolyester resin is more than 90 weight %, the advantages of the polylactic acid resin, specifically, biodegradability, saving of petroleum resources, reduction of discharge of carbonic acid gas, and so on may not be achieved. When the amount of the polylactic acid resin is more than 95 weight %, or the amount of the copolyester resin is less than 5 weight %, the impact resistance and the heat resistance of the blend are deteriorated, and the blend cannot be used for producing various molded articles. If necessary, besides the polylactic acid resin and the copolyester resin, 0 to 40 weight part, for example, 1 to 30 weight part of other resin with respect to 100 weight part of the blend can be used with the blend.

The polylactic acid resin and copolyester resin can be simply blended and then directly extruded or injection-molded. Also, the polylactic acid resin and copolyester resin can be blended and compound extruded to produce pellets, and the pellet-shaped blend chip is cooled and crystallized and can be used for extrusion or injection molding of articles.

When the blend of the present invention is molded into a test sample of thickness of 3.0 mm, the notch izod impact strength (ASTM D256 method, measuring temperature: 23° C.) of the test sample is equal or more than 30 J/m, and preferably, equal or more than 50 J/m.

The blend of polylactic acid resin and copolyester resin according to the present invention can be used to produce molded articles having desired shapes(for example, a sheet) by conventional molding processes such as an injection molding, an extrusion, an extrusion-blow molding, an injection blow molding, a profile extrusion, and so on, and , if necessary, by post-processing processes such as a thermoforming process.

BEST MODE

Hereinafter, examples and comparative examples are provided to illustrate the present invention in more detail, but the present invention is not limited by the following examples.

In the following examples and comparative examples, the evaluations of polymer (blend) are carried out as follows.

(1) Heat-resistance (Tg): Glass-rubber transition temperature (Tg). A polymer (blend) is annealed at 300° C. for 5 minutes and cooled to room temperature. Then, the polymer is heated with a temperature increasing speed of 10°C./min ($2^{nd}$ scan), and Tg is measured during the $2^{nd}$ scan.

(2) Impact strength: A test sample having a thickness of 3.0 mm is prepared with polymer (blend). The test sample is notched according to ASTM D256, and the izod impact strength is measured at 23° C. with an izod impact strength measuring machine.

(3) Formation of air bubbles after thermoforming process: A polymer (blend) is thermoformed to a plate having a shape of "SK" at 130° C. with a Gaiss thermoforming machine, and the formation of air bubbles is examined with naked eyes.

(4) Inclusion of harmful material: The inclusion of harmful material in a polymer is examined with Nuclear magnetic resonance (NMR) spectroscopy.

Manufacturing Example 1

Preparation of Copolyester Resin 6 mol of terephthalic acid (acid component) and 138 g of 1,4-cyclohexanedimethanol, 313 g of ethylene glycol, and 105 g of isosorbide (diol component) with respect to the 6 mol of terephthalic acid were mixed in a 3 L reactor having a stirrer and a condenser, and the reactor was slowly heated to 255° C. to carry out the esterification reaction. Water produced during the esterification reaction was removed from the reaction system. When the production and outflow of water is completed, the reactants were transferred to a polycondensation reactor having a stirrer, a cooling condenser and a vacuum system. A catalyst, a stabilizer and a brightening agent were added to the esterification reactants, and the internal temperature of the reactor was increased to from 240° C. to 275° C., and the pressure was reduced to 50 mmHg from atmospheric pressure (first pressure reduction) and ethylene glycol was removed for 40 minutes under the low pressure reaction. The pressure was further slowly reduced to 0.1 mmHg and the polycondensation reaction was carried out under the high vacuum condition to produce copolyester resin until a desired intrinsic viscosity of the copolyester resin was achieved.

Manufacturing Example 2

Preparation of Copolyester Resin

Except for using 6 mol of terephthalic acid (acid component) and 640 g of 1,4-cyclohexanedimethanol, 150 g of ethylene glycol, and 850 g of isosorbide (diol component) with respect to the 6 mol of terephthalic acid, the copolyester resin was prepared according to the method of Manufacturing Example 1.

Example 1

Preparation and Evaluation Of Blend of Polylactic Acid Resin and Copolyester Resin 10 weight % of polylactic acid resin chip having the number average molecular weight of 10,000 and 90 weight % of the copolyester resin chip prepared in Manufacturing Example 1 were introduced into a Haake compounding machine, and blended at a cylinder temperature of 260° C., a die temperature of 255° C., and a screw speed of 50 rpm to produce a blend of polylactic acid resin and copolyester resin having a pellet shape. The Glass-rubber transition temperature, the notch izod impact strength, the formation of air bubbles after thermoforming process, and the inclusion of harmful material were evaluated by the previously mentioned methods, and the results are set forth in the following Table 1.

Example 2

Preparation and Evaluation of Blend of Polylactic Acid Resin and Copolyester Resin 40 weight % of polylactic acid resin chip having the number average molecular weight of 10,000 and 60 weight % of the copolyester resin chip prepared in Manufacturing Example 1 were introduced into a Haake compounding machine, and blended at a cylinder temperature of 260° C., a die temperature of 255° C., and a screw speed of 50 rpm to produce a blend of polylactic acid resin and copolyester resin having a pellet shape. The Glass-rubber transition temperature, the notch izod impact strength, the formation of air bubbles after thermoforming process, and the inclusion of harmful material were evaluated by the previously mentioned methods, and the results are set forth in the following Table 1.

Example 3

Preparation and Evaluation of Blend Of Polylactic Acid Resin and Copolyester Resin 80 weight % of polylactic acid resin chip having the number average molecular weight of 10,000 and 20 weight % of the copolyester resin chip prepared in Manufacturing Example 1 were introduced into a Haake compounding machine, and blended at a cylinder temperature of 260° C., a die temperature of 255° C., and a screw speed of 50 rpm to produce a blend of polylactic acid resin and copolyester resin having a pellet shape. The Glass-rubber transition temperature, the notch izod impact strength, the formation of air bubbles after thermoforming process, and the inclusion of harmful material were evaluated by the previously mentioned methods, and the results are set forth in the following Table 1.

Example 4

Preparation and Evaluation of Blend of Polylactic Acid Resin and Copolyester Resin 5 weight % of polylactic acid resin chip having the number average molecular weight of 10,000 and 95 weight % of the copolyester resin chip prepared in Manufacturing Example 2 were introduced into a Haake compounding machine, and blended at a cylinder temperature of 260° C., a die temperature of 255° C., and a screw speed of 50 rpm to produce a blend of polylactic acid resin and copolyester resin having a pellet shape. The Glass-rubber transition temperature, the notch izod impact strength, the formation of air bubbles after thermoforming process, and the inclusion of harmful material were evaluated by the previously mentioned methods, and the results are set forth in the following Table 1.

Comparative Example 1

Preparation and Evaluation of Polylactic Acid Resin Having a Pellet Shape

Without using copolyester resin chip, the polylactic acid resin having a pellet shape was prepared according to the method of Example 1. The Glass-rubber transition temperature, the notch izod impact strength, the formation of air bubbles after thermoforming process, and the inclusion of harmful material were evaluated by the previously mentioned methods, and the results are set forth in the following Table 1.

Comparative Example 2

Preparation and Evaluation of Blend of Polylactic Acid Resin and Polycarbonate Resin 30 weight % of polylactic acid resin chip having the number average molecular weight of 10,000 and 70 weight % of polycarbonate(PC) resin chip were introduced into a Haake compounding machine, and blended at a cylinder temperature of 260° C., a die temperature of 255° C, and a screw speed of 50 rpm to produce a blend of polylactic acid resin and polycarbonate resin having a pellet shape. The Glass-rubber transition temperature, the notch izod impact strength, the formation of air bubbles after thermoforming process, and the inclusion of harmful material were evaluated by the previously mentioned methods, and the results are set forth in the following Table 1.

Comparative Example 3

Preparation and Evaluation of Blend of Polylactic Acid Resin and Polycarbonate Resin 70 weight % of polylactic acid resin chip having the number average molecular weight of 10,000 and 30 weight % of polycarbonate(PC) resin chip were introduced into a Haake compounding machine, and blended at a cylinder temperature of 260° C., a die temperature of 255° C, and a screw speed of 50 rpm to produce a blend of polylactic acid resin and polycarbonate resin having a pellet shape. The Glass-rubber transition temperature, the notch izod impact strength, the formation of air bubbles after thermoforming process, and the inclusion of harmful material were evaluated by the previously mentioned methods, and the results are set forth in the following Table 1.

TABLE 1

|  | Example 1 | Example 2 | Example 3 | Example 4 | Comp. Example 1 | Comp. Example 2 | Comp. Example 3 |
|---|---|---|---|---|---|---|---|
| Glass-rubber transition temperature (° C.) | 90 | 80 | 67 | 90 | 50 | 120 | 100 |
| Izod impact strength (3 mm, J/m) | 110 | 100 | 50 | 120 | 20 | 100 | 50 |
| Formation of air bubbles | None | None | None | None | None | Exist | Exist |
| Inclusion of harmful materials | None | None | None | None | None | Bisphenol-A inclusion | Bisphenol-A inclusion |
| Amount of bio monomers (weight %) | 23.5 wt % | 49 wt % | 83 wt % | 19.25 wt % | 100 wt % | 30 wt % | 70 wt % |

As shown in Table 1, the blend of polylactic acid resin and copolyester resin according to the present invention has a desirable heat resistance in which Glass-rubber transition temperature is 67 to 90° C., and a desirable impact resistance in which the notch izod impact strength is 50 to 110 J/m. In addition, the air bubbles is not formed after the thermoforming process, and thereby additional drying process is not necessary in producing molded articles(for example, a sheet) and it is advantageous economically and in time saving. The blend of the present invention is also environmentally advantageous since harmful materials(for example, bisphenol-A) are not included in the blend.

Industrial Applicability

The blend of polylactic acid resin and copolyester resin according to the present invention is useful as a raw material for producing an environmentally desirable molded articles (for example, a sheet, a package, a container, an interior or exterior material for electronic device, an interior or exterior material for automobile, an interior or exterior material for building, and so on).

The invention claimed is:

1. A blend of polylactic acid resin and copolyester resin comprising:
   5 to 95 weight % of polylactic acid resin; and
   5 to 95 weight % of copolyester resin which is a copolymerization product of an acid component including terephthalic acid and a diol component including 5 to 99 mol % of 1,4-cyclohexanedimethanol and 1 to 60 mol % of isosorbide, and has a repeated structure of an acid moiety derived from the acid component and a diol moiety derived from the diol component,
   wherein a notch izod impact strength of the of polyiactic acid resin and copolvester resin is equal or more than 30 J/m, and the copolyester resin shows a glass transition temperature (Tg) of equal or more than 90° C.

2. The blend of polylactic acid resin and copolyester resin according to claim 1, wherein a number average molecular weight of the polylactic acid resin is 10,000 to 500,000.

3. The blend of polylactic acid resin and copolyester resin according to claim 1, wherein, besides (i) terephthalic acid, the acid component includes (ii) a copolymerization acid component which is selected from the group consisting of aromatic dicarboxylic acid component of 8 to 14 carbon atoms and aliphatic dicarboxylic acid component of 4 to 12 carbon atoms in the amount of 0 to 50 mol % with respect to the total acid component.

4. The blend of polylactic acid resin and copolyester resin according to claim 1, wherein the amount of isosorbide (ISB mol %) and the amount of 1,4-cyclohexanedimethanol (CHDM mol %) are within the range of the following Equation 1

$$0.0012(CHDM\ mol\ \%)^2 - 0.2401(CHDM\ mol\ \%) + 14.136 \leq ISB\ mol\ \% \leq 0.0049(CHDM\ mol\ \%)^2 - 0.2255(CHDM\ mol\ \%) + 71.176 \quad \text{[Equation 1]}.$$

5. The blend of polylactic acid resin and copolyester resin according to claim 1, wherein the diol component includes (i) 8 to 91 mol % of 1,4-cyclohexanedimethanol and (ii) 4 to 40 mol % of isosorbide.

6. The blend of polylactic acid resin and copolyester resin according to claim 1, wherein, besides (i) 1,4-cyclohexanedimethanol and (ii) isosorbide, the diol component further include (iii) ethylene glycol and (iv) other copolymerization diol component which is selected from the group consisting of diethylene glycol, Methylene glycol, propanediol, 1,4-butanediol, pentancdiol, hexanediol, neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, tetramethylcyclobutanediol, and mixtures thereof in the amount of 0 to 50 mol % with respect to the total diol component.

7. The blend of polylactic acid resin and copolyester resin according to claim 1, wherein the amount of 1,4-cyclohexanedimethanol is 10 to 90 weight part with respect to 100 weight part of the acid component.

8. A molded article which is produced by molding the blend of polylactic acid resin and copolyester resin according to claim 1.

9. A molded article which is produced by molding the blend of polylactic acid resin and copolyester resin according to claim 2.

10. A molded article which is produced by molding the blend of polylactic acid resin and copolyester resin according to claim 3.

11. A molded article which is produced by molding the blend of polylactic acid resin and copolyester resin according to claim 4.

12. A molded article which is produced by molding the blend of polylactic acid resin and copolyester resin according to claim 5.

13. A molded article which is produced by molding the blend of polylactic acid resin and copolyester resin according to claim 6.

14. A molded article which is produced by molding the blend of polylactic acid resin and copolyester resin according to claim 7.

* * * * *